Figure 1:
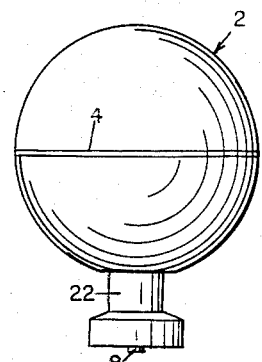

United States Patent [19]

Riead

[11] Patent Number: 4,506,471
[45] Date of Patent: * Mar. 26, 1985

[54] LINE ATTACHMENT FOR FISHING FLOAT

[75] Inventor: John T. Riead, Cameron, Mo.

[73] Assignee: Rieadco Corporation, Cameron, Mo.

[*] Notice: The portion of the term of this patent subsequent to Jan. 24, 2001 has been disclaimed.

[21] Appl. No.: 533,436

[22] Filed: Sep. 19, 1983

[51] Int. Cl.³ .............................................. A01K 93/00
[52] U.S. Cl. ................... 43/44.87; 43/44.95
[58] Field of Search ............... 43/44.95, 44.94, 44.92, 43/44.87

[56] References Cited

U.S. PATENT DOCUMENTS 2,560,129  7/1951  Rhotehamel ................. 43/44.95
4,426,805  1/1984  Riead ........................... 43/44.95

Primary Examiner—Nicholas P. Godici
Assistant Examiner—Chris McKee
Attorney, Agent, or Firm—John A. Hamilton

[57] ABSTRACT

A line attachment device for a fishing float having a buoyant body member, the device consisting of a stem fixed in the body member and projecting outwardly therefrom, and having at its outer end a conically enlarged head terminating in a flat, circular flange having a re-entrant peripheral lip of larger diameter than the head, the lip, flange and head having a first notch extending radially inwardly from the outer periphery thereof, and a second generally U shaped groove formed therein in a plane generally parallel to the stem and opening at its ends through the outer end of the head. A plunger slidably encircles the stem and has its outer end socketed to mate with said stem head, flange and lip, but does not enter said notch or groove. A spring biases the plunger outwardly on the stem, but the plunger may be retracted manually to permit a fishing line to be looped around the stem head. The line reaches are led outwardly through the first notch if it is desired that the float be fixed on the line, or through the second groove if it is desired that the float have a free-running movement along the line.

4 Claims, 7 Drawing Figures

LINE ATTACHMENT FOR FISHING FLOAT

This invention relates to new and useful improvements in fishing floats, or "bobbers", and represents improvements over the fishing float shown in my prior copending application Ser. No. 06/414,883, filed Sept. 3, 1982, since issued on Jan. 24, 1984 as U.S. Pat. No. 4,426,805 reference being had to said prior application for further details of operation.

A fishing float normally consists of a small buoyant body member attachable to a fishing line intermediate the fishing rod and the hook and bait or lure at the free end of the line. In some circumstances, it may be desired to attach the float firmly to the line, but so that it may be adjusted along the line to a distance from the hook corresponding to the water depth at which it is desired to fish. The float will then support the hook at that depth, "mark" the hook, and by its bobbing motion, give an indication when a fish takes the hook. These are the circumstances addressed in my above identified prior application.

However, in other circumstances the fisherman may desire to engage in casting. Casting is quite difficult with a float fixed on the line, since the uncontrolled "leader" portion of the line, between the float and the hook, is quite likely to become fouled either with itself or with overhanging trees, marine vegetation or other nearby obstructions. In these circumstances, it is desirable that the float be free-running along the line. The float may then move to the hook so that there is no uncontrolled leader line section during the casting, but after the float strikes the water surface, the line is pulled therethrough by the weight of the hook and lure, or a lead "sinker" provided for that purpose, and the hook will sink. If it is desired to fish at a specific water depth, a stop may be adjustably fixed to the line above the float, incapable of passing through said float. It is to this second set of circumstances that the present invention is primarily directed.

Accordingly, an object of the present invention is the provision of an attaching device for securing a fishing float to a line and operable to permit free running of the line relative to the float. Generally, this object is accomplished by the provision of a member mounted on the float and having a groove formed therein, a plunger movable relative to the grooved member, and a spring yieldably biasing the plunger to close the open side of said groove, whereby to constitute said groove as a "tunnel" of ample cross-sectional area to permit free running of the line therethrough.

Another object is the provision of an attaching device of the character described operable to permit selectively either a free-running connection as described, or a clampingly fixed mounting of the float on the line.

A further object is the provision of a line attaching device of the character described in which structural features contributing to either the free-running or to the clamped type of connection contribute also to the efficiency and effectiveness of the other type of connection.

Other objects are simplicity and economy of construction, and efficiency and dependability of operation.

Figure 2:
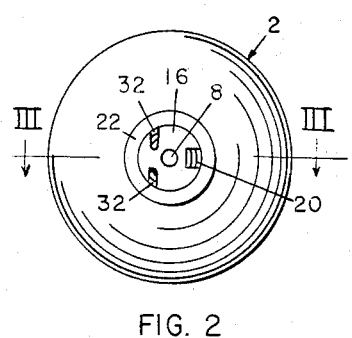
Figure 3:
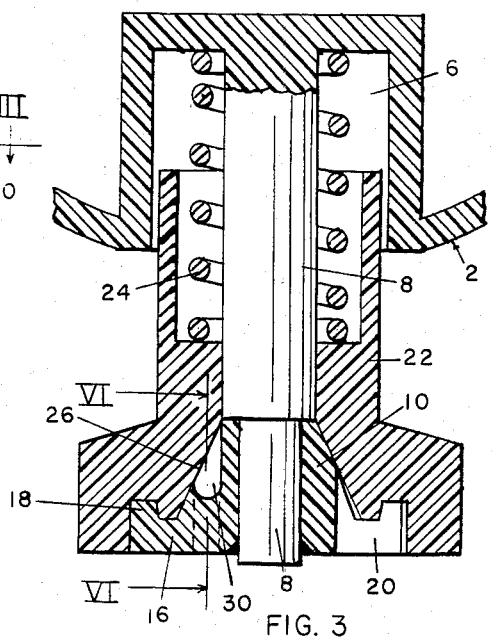
Figure 4:
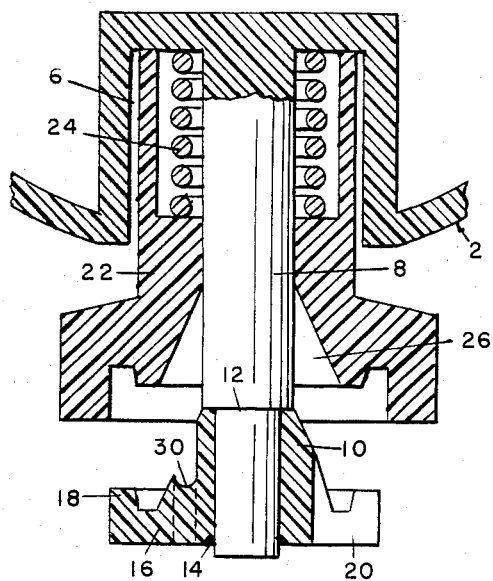
Figure 5:
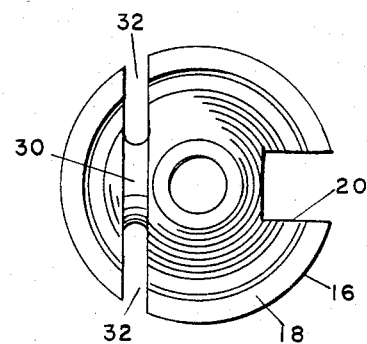
Figure 6:
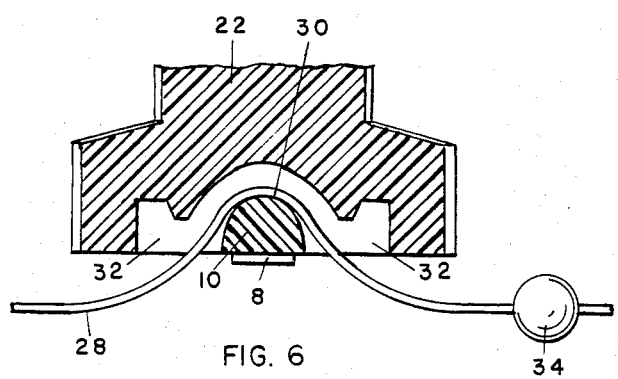
Figure 7:
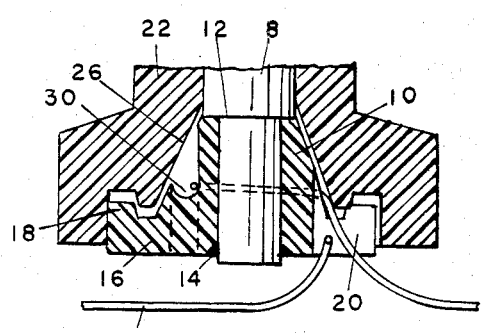

With these objects in view, as well as other objects which will appear in the course of the specification, reference will be had to the accompanying drawing, wherein:

FIG. 1 is a side elevational view of a fishing float incorporating therein a line attaching device embodying the present invention, FIG. 2 is an inverted plan view of the float as shown in FIG. 1, FIG. 3 is an enlarged, fragmentary sectional view taken on line III—III of FIG. 2, FIG. 4 is a view similar to FIG. 3, but showing the device open to receive a line therein, FIG. 5 is a top plan view of the male conical head forming an element of the device, shown separated from the remainder of the structure, FIG. 6 is a fragmentary sectional view taken on line VI—VI of FIG. 3, showing a fishing line engaged therein for free-running movement, and FIG. 7 is a fragmentary view similar to FIG. 3, but showing a fishing line clampingly engaged therein.

Like reference numerals apply to similar parts throughout the several views, and the numeral 2 applies generally to the body of a fishing float, shown by way of example only as spherical. It is formed of a plastic material, and is hollow to render it buoyant. It may be formed in two halves, which are then joined to seal the interior by a sonic weld 4, or in any other suitable manner. Sonic welding is a process in which ultrasonic waves are utilized to "fuse" abutting plastic members together.

One of the body halves has an outwardly opening "well" 6 formed therein, and an integral stem 8 projecting axially from the base of the well to a point well outwardly from the float body. The stem is of substantially smaller diameter than the well. Affixed to the outer end of the stem is a head 10 having the form of a generally solid cone coaxial with the stem, the conical surface thereof being taperingly enlarged outwardly of the stem, its diameter at its smaller end being equal to that of the stem above it. Said head has a central bore engageable over the stem. It may then be seated against a shoulder 12 of the stem, and secured rigidly in place by a sonic weld 14. At the outer, larger end of the conical form of the head, it is provided with an integral, generally flat peripheral flange 16, concentric with the stem but of larger diameter than the larger end of the cone. At its peripheral edge, and spaced apart from the cone, flange 16 is provided with a re-entrant lip 18 around its entire periphery. A notch 20 is cut radially inwardly from the outer edge of flange 16, cutting through said flange and lip 18, and being of such depth as to extend also into the conical form of the head, as best shown in FIGS. 4 and 5.

Carried for axial sliding movement in well 6 is a plunger 22 of cylindrical form which is bored to fit slidably around stem 8. Said plunger is socketed at its inner end to receive a coiled compression spring 24 bearing at one end against the plunger and at is opposite end against the base wall of well 6, whereby the plunger is biased outwardly along the stem. At its outer end, outwardly of body 2, the plunger is enlarged, and axially socketed as at 26 to mate precisely with conical head 10 flange 16 and lip 18 when the plunger is moved outwardly on stem 8 by spring 24. The plunger does not extend into notch 20.

The structure thus far described is shown in my prior application above identified, and provides for clamping the float to a fishing line 28 in non-slip relation thereto. In this usage, plunger 22 is manually pressed inwardly against the pressure of spring 24 to open a gap between stem head 10 and the outer end of plunger 22, as shown in FIG. 4. A bight of line 28 is then looped around head 10 within this gap, with both reaches of the loop being lead outwardly through notch 20, and the plunger released. The line loop is then gripped firmly between the mating conical surfaces of the head and plunger, as indicated in FIG. 7, the clamping force being equal to the full force of spring 24, further multiplied by the acutely angled relation of the conical surfaces to the stem axis. This anchors the line firmly against accidental slippage relative to the float, and against accidental dislodgement therefrom, except for problems introduced by the extremely hard, slick-surfaced nature of the monofilament nylon strands commonly used for fishing lines. These line characteristics will not ordinarily permit longitudinal slippage of the line between the conical clamping surfaces, since the line is clamped along a substantial portion of its length, but it will permit slippage of the line transversely of itself at its points of entry or exit into or from the clamping surfaces. Thus slippage can be cummulative, so that the line can "inch" its way around the head and eventually be released. Features of the prior application minimizing any possibility of such an occurrence are the provision of notch 20, so that at least one reach of the line, the one engaging the base of the notch, can never enter between the clamping surfaces, even though they are held apart by the clamped portion of the line. The other reach of the line, however, could enter between the clamping surfaces, and inch its way around the head, were it not for the interengaging relation of head lip 18 and its corresponding groove in the plunger cavity. This clamped "non-slip" line attachment is fully disclosed in my prior application, and further details and discussion relative thereto may be had by reference to said application.

However, experience has shown that in rare instances the clamped line may still work its way free of the clamping surfaces, usually as a result of repetitive tensioning "jerks" on the line which may occur during fishing. Such jerks tend to compress spring 24 momentarily, loosening the grip of the clamping surfaces on the line, and even may pull head lip 18 out of engagement with its corresponding groove of the plunger cavity. The present invention provides means reducing any possibility of such an occurrence.

According to the present invention, an upwardly opening groove 30 is formed in the conical surface of head 10 at the side thereof diametrically opposite from notch 20. Said groove lies in a plane parallel to the stem axis, and since it is formed in a conical surface, it is of generally parabolic form in its own plane. It opens through the outer end of the head at both ends, and each end thereof interconnects with a slot 32 extending outwardly therefrom through the entire thickness of head flange 16 and lip 18. Slots 32 lie in the same plane as the groove 30.

The principal function of groove 30 and slots 32 is to permit the float to be mounted on fishing line 28 for free-running movement therealong. To accomplish this type of mounting, plunger 22 is as before retracted along stem 8 against spring 24, and a loop of line 28 is laid into groove 30, the reaches of the line adjacent the loop entering through slots 32. At this moment groove 30 constitutes an open-topped, open-ended "tunnel". When plunger 22 is then released and is moved outwardly by spring 24 to engage the head, it closes the top but not the ends of this "tunnel", with line 28 running freely therethrough, as shown in FIG. 6. The tunnel is of ample cross-sectional area to permit free running of the line therethrough.

This type of free-running connection is of course useful when casting. During casting, the float runs freely to the fishhook, and bait or lure, so that there is no uncontrolled "leader" portion of the line between the float and the hook. When the float strikes the water surface, the float is retained at water level by its buoyancy, while the line is pulled freely therethrough by the weight of the hook, lure or bait, either until the hook reaches the bottom, or to the limit of the slack existing in the line. If fishing at a specific depth is desired, a stop member 34 (see FIG. 6) may be attached to the line at the desired distance from the float, but at the opposite side of the float. The stop is too large to pass through groove 30, and may be adjustably movable along the line. It is not considered to be a part of the present invention, and is not here detailed. Several forms thereof are commonly available commercially.

It will be seen also that the structural features providing each type of line connection also contribute to the efficiency of the other type of connection. For example, when using the clamped connection shown in FIG. 7, it will be seen that since groove 30 is diametrically opposite from notch 20, the loop of line 28 encircling the head will be engaged in groove 30, as shown. This engagement positively prevents the line loop from working downwardly between the conical clamping surfaces, or toward the "open" lower edges of said surfaces. This downward movement of the loop as previously described, represents a possible, though rare, cause of failure of the connection and accidental disconnection of the line from the float. Also, when using the free-running line connection shown in FIG. 6, the spring 24, which is used to supply clamping force in the clamped connection of FIG. 7, serves to hold the plunger socket 26 in precise mating engagement with the head, so that there is no spacing apart whatsoever of the clamping surfaces. Any space between these surfaces might, when the line is slack, permit the line to enter therebetween and work free. The interengagement of head lip 18 in the corresponding groove of the plunger contributes in the same manner to the efficiency of both the clamped and the free-running connection, by providing a serpentine pathway further tending to defeat any possibility that the exiting reaches of the line might enter between the mating surfaces of the head and plunger.

While I have shown and described a specific embodiment of my invention, it will be readily apparent that many minor changes of structure and operation could be made without departing from the spirit of the invention.

What I claim as new and desire to protect by Letters Patent is:

1. A fishing line attachment device for a fishing float having a buoyant body member, said device comprising:
   a. an elongated stem fixed at one end in said body member and projecting outwardly therefrom, the outer end portion of said stem being enlarged to form a head having a surface confronting said body member, said surface having an open-ended groove formed therein in which a fishing line may be laid, said groove being disposed in a plane parallel to said stem but laterally offset therefrom, and opening at its ends through the outer end of said head, b. a plunger mounted for sliding movement on said stem intermediate said body member and said stem head, and having at its outer end a socket cavity providing a surface operable when said plunger is moved outwardly to mate with said head surface to close the open side but not the ends of said groove, whereby to constitute said groove as an open-ended tunnel through which said fishing line may run freely, and c. s spring biasing said plunger yieldably outwardly along said stem, said plunger being manually retractable against said spring to open said groove, said mating surfaces of said head and said plunger being conical in form, taperingly reduced in diameter toward said body member, whereby the force of said spring when urging said plunger to clamp a fishing line between said head and plunger surfaces is magnified by the conical form of said surfaces.

2. The structure as recited in claim 1 wherein said stem is notched radially inwardly from its periphery at a point angularly offset from the groove of said head surface, whereby a fishing line looped around said head with its reaches lead outwardly through said notch may pass through a portion of said groove but not through the open ends of said groove.

3. The structure as recited in claim 2 wherein the outer end of said stem, at the outer end of the conical clamping surface thereof, is provided with a generally planar peripheral flange normal to the stem axis, said notch and both ends of said groove also extending outwardly through the entire thickness of said flange, and wherein said plunger socket cavity is provided, at the outer end of the conical clamping surface thereof, with a socket portion capable of receiving said flange snugly therein when said conical clamping surfaces are mated.

4. The structure as recited in claim 3 wherein said flange is provided with a re-entrant peripheral lip, extending toward said plunger and of greater diameter than the conical clamping surface thereof, said notch and both ends of said groove also intersecting said lip, and wherein the flange receiving portion of said plunger cavity is provided at its base with a peripheral groove capable of receiving said lip snugly therein when said conical clamping surfaces are mated.

* * * * *